United States Patent
Shimuta

(10) Patent No.: US 12,495,979 B2
(45) Date of Patent: Dec. 16, 2025

(54) BLOOD PRESSURE ESTIMATING DEVICE

(71) Applicant: Murata Manufacturing Co., Ltd., Nagaokakyo (JP)

(72) Inventor: Toru Shimuta, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1917 days.

(21) Appl. No.: 16/278,879

(22) Filed: Feb. 19, 2019

(65) Prior Publication Data

US 2019/0175033 A1    Jun. 13, 2019

Related U.S. Application Data

(63) Continuation of application No. PCT/JP2017/031329, filed on Aug. 31, 2017.

(30) Foreign Application Priority Data

Sep. 2, 2016  (JP) ................. 2016-172131

(51) Int. Cl.
 *A61B 5/0225*  (2006.01)
 *A61B 5/00*  (2006.01)
 (Continued)

(52) U.S. Cl.
 CPC ............ *A61B 5/02255* (2013.01); *A61B 5/02* (2013.01); *A61B 5/02125* (2013.01);
 (Continued)

(58) Field of Classification Search
 None
 See application file for complete search history.

(56) References Cited

U.S. PATENT DOCUMENTS

| | | | |
|---|---|---|---|
| 5,649,543 | A | 7/1997 | Hosaka et al. |
| 2001/0003792 | A1 | 6/2001 | Ogura et al. |
| | | (Continued) | |

FOREIGN PATENT DOCUMENTS

| | | |
|---|---|---|
| JP | 07-327940 A | 12/1995 |
| JP | 10-314130 A | 12/1998 |
| | (Continued) | |

OTHER PUBLICATIONS

Moco, Andreia Vieira, Sander Stuijk, and Gerard de Haan. "Skin inhomogeneity as a source of error in remote PPG-imaging." Biomedical optics express 7.11 (2016): 4718-4733. (Year: 2016).*

(Continued)

*Primary Examiner* — Jacqueline Cheng
*Assistant Examiner* — Jairo H Portillo
(74) *Attorney, Agent, or Firm* — Keating & Bennett, LLP

(57) ABSTRACT

A signal processor of a blood pressure estimating device includes a pulse wave transit time acquirer that acquires a pulse wave transit time based on a pulse wave signal detected by a photoplethysmographic sensor and an electrocardiographic signal, a time measurer that measures a time elapsed from when acquisition of the pulse wave transit time is started, and a blood pressure estimator that estimates a blood pressure based on a predetermined relationship between the pulse wave transit time and the blood pressure. The photoplethysmographic sensor is in contact with a neck of a user at a position not directly over a carotid artery when the pulse wave transit time is acquired, and the blood pressure estimator estimates the blood pressure after the measured elapsed time has become a predetermined time or more.

16 Claims, 8 Drawing Sheets

(51) Int. Cl.
    *A61B 5/02*     (2006.01)
    *A61B 5/021*     (2006.01)
    *A61B 5/022*     (2006.01)
    *A61B 5/107*     (2006.01)
    *A61B 5/349*     (2021.01)
    *A61B 5/024*     (2006.01)
    *A61B 5/0245*     (2006.01)
    *A61B 5/0285*     (2006.01)
    *A61B 5/25*     (2021.01)

(52) U.S. Cl.
    CPC .............. *A61B 5/022* (2013.01); *A61B 5/107* (2013.01); *A61B 5/349* (2021.01); *A61B 5/6822* (2013.01); *A61B 5/721* (2013.01); *A61B 5/7239* (2013.01); *A61B 5/725* (2013.01); *A61B 5/02416* (2013.01); *A61B 5/0245* (2013.01); *A61B 5/0285* (2013.01); *A61B 5/25* (2021.01)

(56) References Cited

U.S. PATENT DOCUMENTS

| | | | |
|---|---|---|---|
| 2002/0147403 A1* | 10/2002 | Ogura | A61B 5/022 600/500 |
| 2003/0163051 A1 | 8/2003 | Eckerle et al. | |
| 2004/0064054 A1* | 4/2004 | Clift | A61B 5/0205 600/483 |
| 2006/0200011 A1 | 9/2006 | Suzuki et al. | |
| 2009/0018453 A1* | 1/2009 | Banet | A61B 5/14551 600/493 |
| 2009/0105556 A1* | 4/2009 | Fricke | A61B 5/0205 600/301 |
| 2010/0241011 A1* | 9/2010 | McCombie | A61B 5/021 600/485 |
| 2013/0338460 A1 | 12/2013 | He et al. | |
| 2014/0155767 A1* | 6/2014 | Fukuda | A61B 5/02125 600/485 |
| 2014/0187941 A1* | 7/2014 | Shusterman | A61B 5/02007 600/480 |
| 2015/0119725 A1* | 4/2015 | Martin | A61B 5/316 600/479 |
| 2015/0366473 A1 | 12/2015 | Shimuta et al. | |
| 2017/0014089 A1* | 1/2017 | Murakami | A61B 5/0077 |
| 2017/0055904 A1* | 3/2017 | Iizuka | A61B 5/6822 |
| 2017/0079534 A1* | 3/2017 | Tchertkov | A61B 5/681 |
| 2018/0263566 A1* | 9/2018 | Kwon | A61B 5/726 |

FOREIGN PATENT DOCUMENTS

| | | |
|---|---|---|
| JP | 2000-237153 A | 9/2000 |
| JP | 2001-161649 A | 6/2001 |
| JP | 2003-260033 A | 9/2003 |
| JP | 2006-212218 A | 8/2006 |
| JP | 2015-519999 A | 7/2015 |
| WO | 2014/132713 A1 | 9/2014 |

OTHER PUBLICATIONS

Official Communication issued in corresponding Japanese Patent Application No. 2018-537392, mailed on Nov. 12, 2019.
Official Communication issued in International Patent Application No. PCT/JP2017/031329, mailed on Oct. 24, 2017.

\* cited by examiner

BLOOD PRESSURE ESTIMATING DEVICE

CROSS REFERENCE TO RELATED APPLICATIONS

This application claims the benefit of priority to Japanese Patent Application No. 2016-172131 filed on Sep. 2, 2016 and is a Continuation Application of PCT Application No. PCT/JP2017/031329 filed on Aug. 31, 2017. The entire contents of each application are hereby incorporated herein by reference.

BACKGROUND OF THE INVENTION

1. Field of the Invention

The present invention relates to a blood pressure estimating device, and particularly, to a blood pressure estimating device using a pulse wave transit time.

2. Description of the Related Art

In recent years, a pulse wave transit time has been used as, for example, an index for evaluating the level of arterial stiffness or for estimating a vascular lifetime. The pulse wave transit time is a time taken for a pulse wave to transit in an artery of a living body (e.g., a time from the appearance of an R wave to the appearance of a pulse wave on an electrocardiogram) and reflects a change in blood pressure.

Here, Japanese Unexamined Patent Application Publication No. 2001-161649 discloses a pulse wave transit time information measuring device that detects a bifurcated portion of a carotid artery under skin and that detects a pulse wave from a fixed pulse wave detection position that is determined on the basis of the bifurcated portion so as to obtain accurate pulse wave transit time information.

When obtaining the pulse wave transit time information by using the pulse wave transit time information measuring device, first, a pressure pulse wave detecting sensor that detects a carotid artery pulse wave corresponding to a change in pressure within the carotid artery is worn over the carotid artery using a wearable band on a neck of a living body. The carotid artery is composed of a common carotid artery and a pair of carotid arteries that branch therefrom an internal carotid artery and an external carotid artery. The pressure pulse wave detecting sensor is worn such that a pressing surface is pressed against a bifurcated portion (branch point) at which the pair of the internal carotid artery and the external carotid artery branch from the common carotid artery. Then, when a pulse wave detection position of an artery is determined based on the branch point of the carotid artery, a reference point of the pressure pulse wave obtained from the pulse wave detection position is determined, and a pulse wave transit time DT is calculated from the reference point of the pressure pulse wave. In addition, a pulse wave transit velocity PWV (=L/DT) is calculated from the pulse wave transit time DT and a preset transit distance L, and an estimated blood pressure is calculated from a relationship (ESYS=α·PWV+β or ESYS=α·L/DT+β) that has been obtained in advance.

As described above, with the technique in Japanese Unexamined Patent Application Publication No. 2001-161649 (pulse wave transit time information measuring device), the pulse wave detection position is determined based on the bifurcated portion of the carotid artery, and the pulse wave transit time information is calculated based on the reference point of the pressure pulse wave obtained from the pulse wave detection position. Thus, the pulse wave detection position on an artery is a fixed position. Accordingly, accurate pulse wave transit time information is calculated.

Although a pulse wave signal is acquired at the carotid artery in the device according to Japanese Unexamined Patent Application Publication No. 2001-161649, a slight deviation from the carotid artery might change the measurement portion to a capillary and decrease the amplitude of the pulse wave signal, which might also change the measurement value of the pulse wave transit time. That is, the dependency on the position is high. Accordingly, it is necessary to fix the portion at which the pulse wave signal is acquired during the measurement of the pulse wave transit time, and it is difficult to perform stable measurement. Thus, for example, in a case in which the pulse wave transit time is to be measured while a person is sleeping, stable measurement might not be performed if the measurement position deviates when the person tosses and turns, for example. That is, a stable and accurate blood pressure might no longer be estimated.

In addition, it is difficult to specify the position of the carotid artery without palpation, and it is particularly difficult to specify the position of the carotid artery of a person having a thick neck because of fat or other reasons, even if palpation is performed. Thus, it is difficult for a person to adjust the measurement position to the position of the carotid artery unless the person is an expert. In addition, in a case in which the carotid artery is strongly pressed when the measurement position is adjusted to the carotid artery or during the measurement, plaque separated from the carotid artery may flow into a cerebrovascular vessel and may clog the cerebrovascular vessel to cause cerebral infarction.

SUMMARY OF THE INVENTION

Preferred embodiments of the present invention provide blood pressure estimating devices that each estimate a blood pressure by estimating a pulse wave transit time at the neck. Without adjusting the position of a pulse wave sensor to the carotid artery, and even if the position of the pulse wave sensor deviates, the blood pressure estimating device is able to estimate the blood pressure by measuring a stable and accurate pulse wave transit time.

The carotid artery is located slightly ahead of the lateral center line of a neck (nape). In a lower portion of the neck, the carotid artery extends forward to be located under sternocleidomastoid. According to the knowledge of the inventor of preferred embodiments of the present invention obtained through intense research and development, a pulse wave sensor disposed at a position not directly over the carotid artery measures a longer pulse wave transit time than that measured at the carotid artery because it takes time for the length of an arteriole or a capillary that branches from the carotid artery. In addition, measurement of the pulse wave transit time at the arteriole or capillary near the carotid artery changes the pulse wave transit time at an initial stage of measurement. More specifically, for example, while a pressure is applied, the pressure in the arteriole or the capillary is gradually increased, and the pulse wave transit velocity in the arteriole or capillary is increased, and thus, the pulse wave transit time is reduced. However, the pulse wave transit time is at least longer than that obtained directly over the carotid artery. Thus, the inventor of preferred embodiments of the present invention has discovered that the pulse wave transit time becomes stable after reducing to a certain extent.

Accordingly, a blood pressure estimating device according to a preferred embodiment of the present invention includes an electrocardiographic electrode that detects an electrocardiographic signal; a photoplethysmographic sensor that includes a light emitter and a light receiver and that acquires a photoplethysmographic signal of an arteriole or a capillary; a pulse wave transit time acquirer to acquire a pulse wave transit time based on the electrocardiographic signal detected by the electrocardiographic electrode and the photoplethysmographic signal detected by the photoplethysmographic sensor; a time measurer to measure a time elapsed from start of acquisition of the pulse wave transit time by the pulse wave transit time acquirer; and a blood pressure estimator to estimate a blood pressure based on the acquired pulse wave transit time and a predetermined relationship between the pulse wave transit time and the blood pressure, in which the blood pressure estimator estimates the blood pressure after the elapsed time measured by the time measurer has become a predetermined time or more.

With the blood pressure estimating device according to above-described preferred embodiment of the present invention, since the photoplethysmographic sensor acquires the photoplethysmographic signal of the arteriole or capillary, the photoplethysmographic sensor is not necessarily provided directly over a carotid artery. In addition, a stable photoplethysmographic signal is able to be acquired even if the position of the photoplethysmographic sensor deviates. In addition, as described above, when the pulse wave transit time is measured at the arteriole or capillary, the pulse wave transit time changes at an initial stage of measurement. However, with a blood pressure estimating device according to a preferred embodiment of the present invention, the time elapsed from the start of acquisition of the pulse wave transit time is measured, and after the elapsed time has become the predetermined time or more (after the predetermined time has elapsed), the blood pressure is estimated. Accordingly, the blood pressure is able to be estimated after the pulse wave transit time has become stable, and an accurate blood pressure is able to be estimated. As a result, without adjusting the position of the photoplethysmographic sensor to the carotid artery, and even if the position of the photoplethysmographic sensor deviates (even if the position is changed), the blood pressure (and/or blood pressure variations) is able to be estimated by measuring a stable and accurate pulse wave transit time.

A blood pressure estimating device according to a preferred embodiment of the present invention includes an electrocardiographic electrode that detects an electrocardiographic signal; a photoplethysmographic sensor that includes a light emitter and a light receiver and that acquires a photoplethysmographic signal of an arteriole or a capillary; a pulse wave transit time acquirer to acquire a pulse wave transit time based on the electrocardiographic signal detected by the electrocardiographic electrode and the photoplethysmographic signal detected by the photoplethysmographic sensor; a determiner to determine whether the pulse wave transit time has become stable after start of acquisition of the pulse wave transit time by the pulse wave transit time acquirer; and a blood pressure estimator to estimate the blood pressure based on the acquired pulse wave transit time and a predetermined relationship between the pulse wave transit time and the blood pressure, in which the blood pressure estimator estimates the blood pressure after the determiner has determined that the pulse wave transit time has become stable.

With the blood pressure estimating device according to the above-described preferred embodiment of the present invention, since the photoplethysmographic sensor acquires the photoplethysmographic signal of the arteriole or capillary, the photoplethysmographic sensor is not necessarily provided directly over a carotid artery. In addition, a stable photoplethysmographic signal is able to be acquired even if the position of the photoplethysmographic sensor deviates. In addition, as described above, when the pulse wave transit time is measured at the arteriole or capillary, the pulse wave transit time changes at an initial stage of measurement. However, with the blood pressure estimator according to the present preferred embodiment, after the start of acquisition of the pulse wave transit time, it is determined whether the pulse wave transit time has become stable. After it has been determined that the pulse wave transit time has become stable (after stabilization), the blood pressure is estimated. Accordingly, the blood pressure is able to be estimated after the pulse wave transit time has become stable, and an accurate blood pressure is able to be estimated. As a result, without adjusting the position of the photoplethysmographic sensor to the carotid artery, and even if the position of the photoplethysmographic sensor deviates (even if the position is changed), the blood pressure (and/or blood pressure variations) is able to be estimated by measuring a stable and accurate pulse wave transit time.

In a blood pressure estimating device according to a preferred embodiment the present invention, it is preferable that, when the pulse wave transit time acquirer acquires the pulse wave transit time, the photoplethysmographic sensor is disposed so as to be in contact with a neck of a user at a position not directly over a carotid artery.

In this manner, the photoplethysmographic signal of the arteriole or capillary away from the carotid artery is able to be detected, and based on the photoplethysmographic signal and the electrocardiographic signal (peak), the pulse wave transit time between the heart and the arteriole or capillary is able to be acquired. Since the position of the photoplethysmographic sensor does not have to be adjusted to the carotid artery, any person other than an expert can perform measurement. In addition, even if the position of the photoplethysmographic sensor deviates (even if the position is changed), the blood pressure (and/or blood pressure variations) is able to be estimated by measuring a stable and accurate pulse wave transit time.

In a blood pressure estimating device according to a preferred embodiment of the present invention, it is preferable that, when the pulse wave transit time acquirer acquires the pulse wave transit time, the photoplethysmographic sensor is disposed so as to be in contact with the neck of the user on a left lateral side of the neck.

In this case, the photoplethysmographic sensor is provided so as to be in contact with the left lateral side of the neck. Accordingly, for example, in a left lateral decubitus position, a right lateral decubitus position, or a supine position, the height of a left ventricle, which is a reference of blood pressure, and the height of the photoplethysmographic sensor become equal or substantially equal to each other, and thus, a change in blood pressure is able to be stably measured regardless of the type of lying position. Since the left ventricle is slightly on the left lateral side from the center of the chest, when the photoplethysmographic sensor is provided on the left lateral side of the neck, a deviation between the left ventricle and the photoplethysmographic sensor is reduced in the lateral direction. Furthermore, although the left ventricle is closer to the chest than to the back in the supine position, when the user is in the supine position without a pillow, the neck is in a lower position than the chest. Although depending on the height of the pillow, by disposing the photoplethysmographic sensor on the left lateral side of the neck when using the pillow, the deviation in the height from the left ventricle in the supine position is able to be reduced.

It is preferable that a blood pressure estimating device according to a preferred embodiment of the present invention further includes a pressure detector to detect a pressure of the photoplethysmographic sensor, in which the blood pressure estimator changes, in accordance with the pressure detected by the pressure detector, a transformation to be used when the blood pressure is calculated from the pulse wave transit time.

The time before the pulse wave transit time becomes stable and the value at the time the pulse wave transit time becomes stable change depending on the pressure of the photoplethysmographic sensor. That is, the change after the start of measurement of the pulse wave transit time at the arteriole or capillary is influenced by the pressure of the photoplethysmographic sensor. However, in this case, the pressure of the photoplethysmographic sensor is measured, and in accordance with the pressure, a constant of the transformation between the pulse wave transit time and the blood pressure is changed. Thus, a more accurate blood pressure is able to be estimated.

It is preferable that a blood pressure estimating device according to a preferred embodiment of the present invention further includes a pressure adjuster that adjusts the pressure to a predetermined value in accordance with the pressure detected by the pressure detector.

In this case, the mechanism that adjusts the pressure in accordance with the measured pressure is able to maintain the pressure at an optimal value. Thus, a more accurate blood pressure is able to be estimated.

In a blood pressure estimating device according to a preferred embodiment of the present invention, it is preferable that a housing to which the photoplethysmographic sensor is attached is elastically deformed such that a contact area with the neck of the user is changed in accordance with the pressure of the photoplethysmographic sensor.

In this case, the contact area between the housing and the skin of the user is changed in accordance with the pressure of the photoplethysmographic sensor. Thus, by increasing the contact area when the pressure is increased, for example, pain is able to be prevented, or indentations on the skin are able to be prevented.

In a blood pressure estimating device according to a preferred embodiment of the present invention, it is preferable that the light-emitting element output blue to yellow-green light.

Note that the blue to yellow-green light (e.g., light with a wavelength of about 450 nm to about 580 nm) is likely to be absorbed in a living body unlike near-infrared light (e.g., light with a wavelength of about 800 nm to about 1000 nm). Thus, by using a light source of the blue to yellow-green light (the photoplethysmographic sensor) as the light emitter (the photoplethysmographic sensor), light is unlikely to reach the carotid artery beneath the skin. Accordingly, even if the photoplethysmographic sensor is disposed directly over the carotid artery, the photoplethysmographic signal in accordance with the blood flow in an arteriole or a capillary near the carotid artery, not in the carotid artery, is able to be acquired.

It is preferable that a blood pressure estimating device according to a preferred embodiment of the present invention further includes an input to receive an operation of inputting a height or a sitting height of the user, in which the blood pressure estimator obtains a length of an artery between an aortic valve and the carotid artery based on the height or sitting height received by the input and corrects the blood pressure in accordance with the length of the artery.

Note that the pulse wave transit velocity has a direct correlation with the blood pressure, and thus, if the length of the artery is known, by converting the pulse wave transit time to the pulse wave transit velocity, a more accurate blood pressure is able to be estimated. In this case, the length of the artery between the aortic valve and the neck (carotid artery) is obtained based on the received height or sitting height of the user, and the blood pressure is corrected in accordance with the length of the artery. Thus, a more accurate blood pressure is able to be estimated.

According to preferred embodiments of the present invention, without adjusting the position of the pulse wave sensor to the carotid artery, and even if the position of the pulse wave sensor deviates, blood pressure estimating devices that each estimate the blood pressure by measuring the pulse wave transit time at the neck are able to estimate the blood pressure by measuring a stable and accurate pulse wave transit time.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
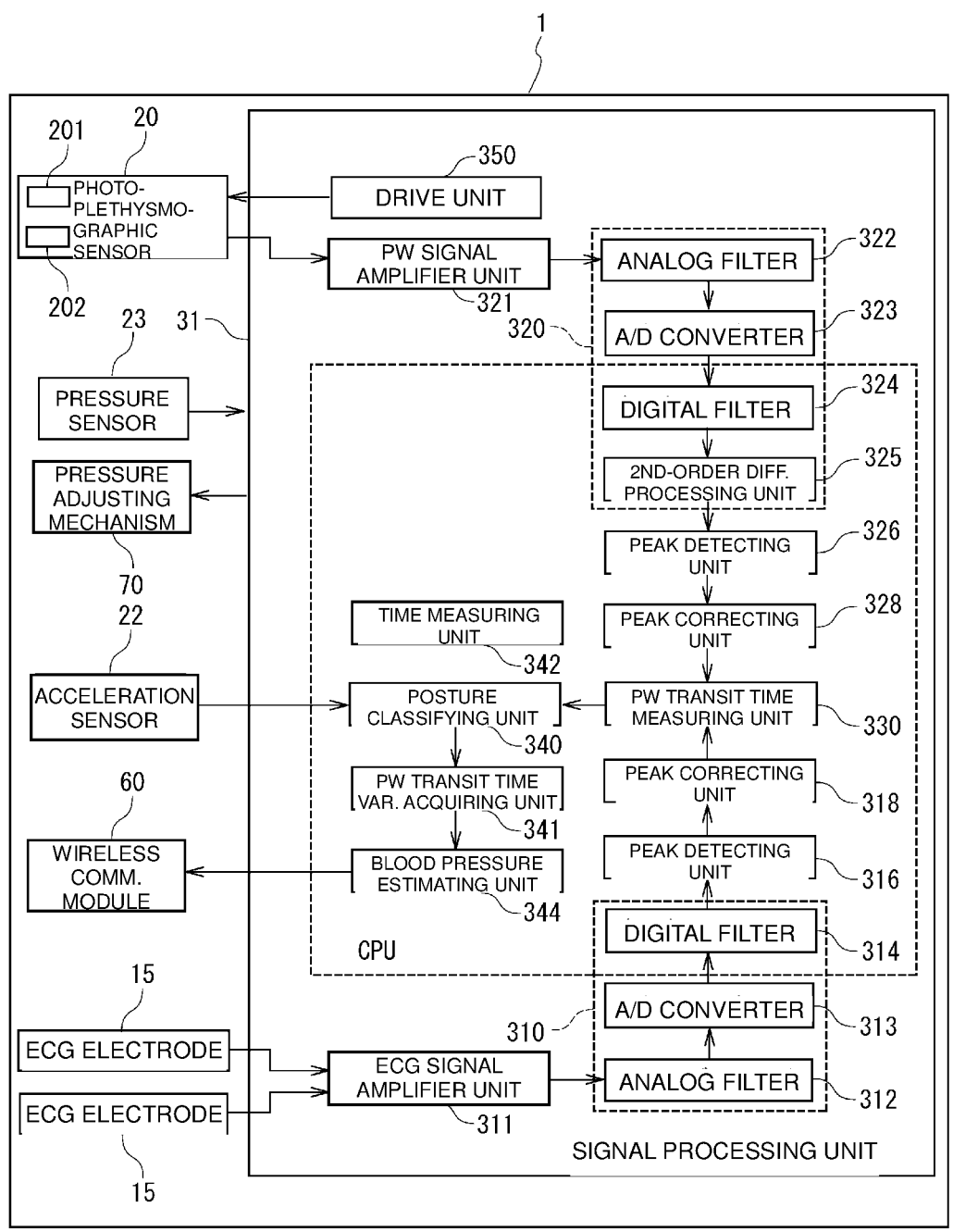
FIG. 1 is a block diagram illustrating a configuration of a blood pressure estimating device using a pulse wave transit time according to a first preferred embodiment of the present invention.

Preferred embodiments of the present invention will be described in detail with reference to the drawings. Note that the same reference numerals are used for the same or corresponding portions in the drawings. In addition, the same reference numerals denote the same or similar elements in the drawings, and a repeated description thereof will be omitted.

First Preferred Embodiment

Figure 2:
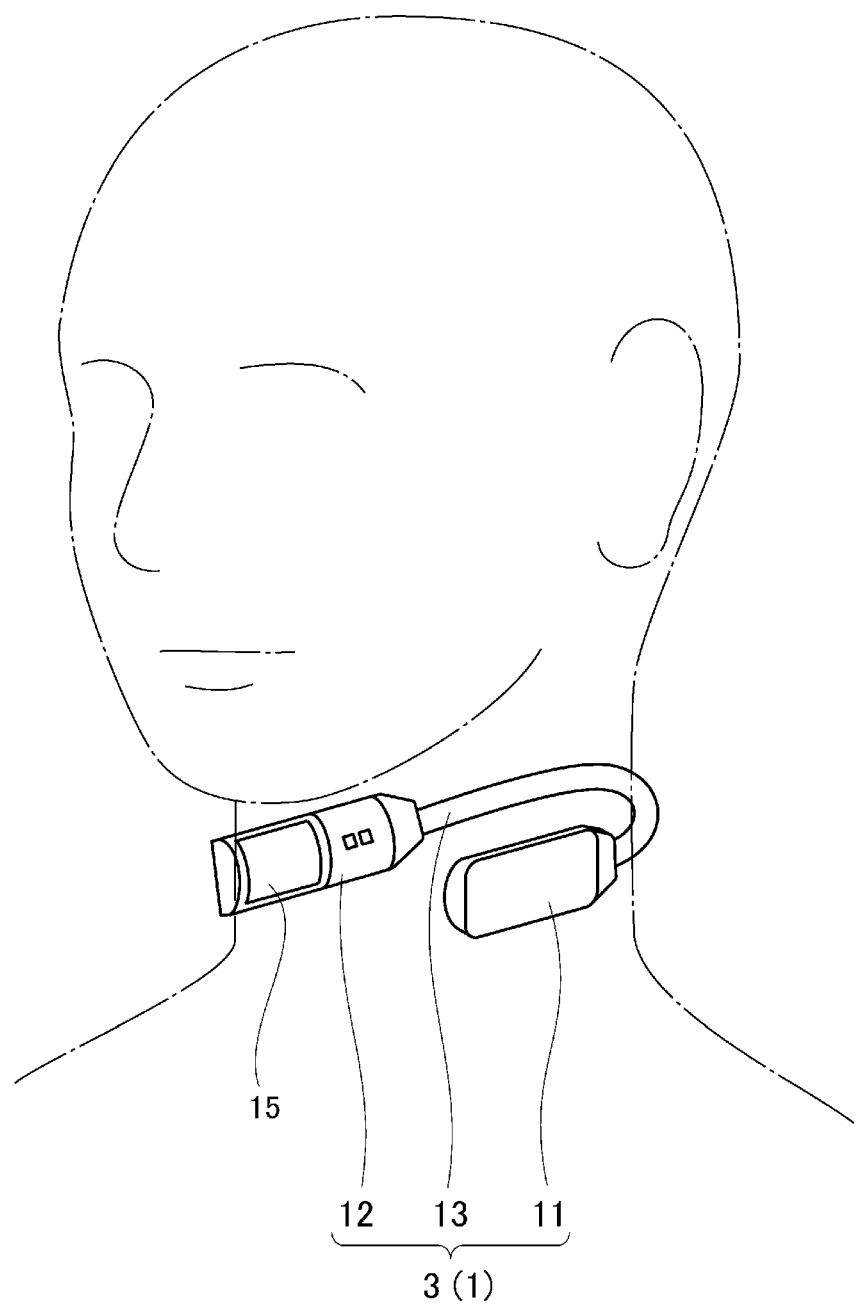
FIG. 2 is a perspective view of an external appearance of the blood pressure estimating device having a neck band configuration according to the first preferred embodiment of the present invention.

With reference to both FIG. 1 and FIG. 2, a configuration of a blood pressure estimating device 1 using a pulse wave transit time according to a first preferred embodiment of the present invention will be described. FIG. 1 is a block diagram illustrating the configuration of the blood pressure estimating device 1. FIG. 2 is a perspective view of an external appearance of the blood pressure estimating device 1 of a neck band configuration.

The blood pressure estimating device 1 detects an electrocardiographic signal and a photoplethysmographic signal. From a time difference between an R wave peak of the detected electrocardiographic signal and a rising point (peak) of the detected photoplethysmographic signal (acceleration pulse wave), the blood pressure estimating device 1 measures a pulse wave transit time. Based on time-series data of the measured pulse wave transit time, the blood pressure estimating device 1 estimates a blood pressure (and/or blood pressure variations) of a user. In particular, without adjusting the position of a photoplethysmographic sensor 20 to a carotid artery, and even if the position of the photoplethysmographic sensor 20 deviates (even if the position is changed), the blood pressure estimating device 1 estimates the blood pressure by measuring a stable and accurate pulse wave transit time.

Thus, the blood pressure estimating device 1 mainly includes a pair of electrocardiographic electrodes 15 and 15 to detect the electrocardiographic signal, the photoplethysmographic sensor 20 to detect the photoplethysmographic signal, an acceleration sensor 22 to sense a posture of a user, a pressure sensor 23 to detect a pressure of the photoplethysmographic sensor 20, and a signal processor 31 that measures and corrects the pulse wave transit time from the detected electrocardiographic signal and photoplethysmographic signal to estimate the blood pressure (and/or blood pressure variations).

Here, in the present preferred embodiment, as illustrated in FIG. 2, the blood pressure estimating device 1 has a neck band configuration. For example, as illustrated in FIG. 2, the blood pressure estimating device 1 is worn around the neck (nape) so as to acquire the time-series data of the pulse wave transit time to estimate the blood pressure (and/or blood pressure variations). In addition, the blood pressure estimating device 1 includes a substantially U-shaped (or C-shaped) neck band 13 that is elastically worn around the neck of the user from the backside and a pair of sensor portions 11 and 12 that are disposed at both ends of the neck band 13 so as to be in contact with both lateral sides of the neck of the user.

The neck band 13 may be worn along a circumferential direction of the neck of the user. That is, the neck band 13 is worn along the backside of the neck of the user from one lateral side of the neck of the user to the other lateral side of the neck. More specifically, the neck band 13 includes, for example, a band-shaped leaf spring and a rubber cover that covers the periphery of the leaf spring. Accordingly, the neck band 13 is energized to compress inside and is held in a state in which the neck band 13 (the sensor portions 11 and 12) is in contact with the neck of the user when the user wears the neck band 13.

Note that the rubber cover preferably has biocompatibility. Instead of the rubber cover, for example, a plastic cover may also be used. Inside the rubber cover, a cable that electrically connects the sensor portions 11 and 12 to each other is also wired. Note that the cable is preferably a coaxial cable, for example, so as to reduce noise.

The sensor portions 11 and 12 include the pair of electrocardiographic electrodes 15 and 15. The electrocardiographic electrodes 15 may preferably be made of, for example, silver-silver chloride, conductive gel, conductive rubber, conductive plastic, a metal (preferably being highly resistant to corrosion and less metal-allergic, such as stainless steel or Au), a conductive cloth, a capacitive coupling electrode provided by coating a metal surface with an insulating layer, or other electrode material. The conductive cloth may be, for example, a woven fabric, a knit fabric, or an unwoven fabric made using conductive fibers with electrical conductivity. The conductive fibers may be, for example, resin fibers plated with a metal such as Ag, coated with carbon nanotubes, or coated with a conductive polymer such as PEDOT. Alternatively, a conductive polymer fiber with electrical conductivity may also be used. In the present preferred embodiment, a conductive cloth 15 having a rectangular or substantially rectangular planar shape, for example, is preferably used as the electrocardiographic electrodes 15. The pair of electrocardiographic electrodes 15 and 15 are connected to the signal processor 31 and outputs the electrocardiographic signal to the signal processor 31.

The photoplethysmographic sensor 20 is disposed on an inner surface of the sensor portion 11 (surface in contact with the neck) near the electrocardiographic electrode 15. The photoplethysmographic sensor 20 includes a light emitter 201 and a light receiver 202 and detects the photoplethysmographic signal. The photoplethysmographic sensor 20 optically detects the photoplethysmographic signal using light-absorption characteristics of blood hemoglobin.

The light emitter 201 emits light in accordance with a pulsed driving signal that is output from a driver 350 of the signal processor 31, which will be described later. The light emitter 201 may preferably be, for example, an LED, a VCSEL (Vertical Cavity Surface Emitting LASER), a resonator LED, or other suitable light emitter. The driver 350 produces and outputs the pulsed driving signal to drive the light emitter 201.

The light receiver 202 outputs a detection signal in accordance with an intensity of light emitted from the light emitter 201 and returned after passing through or being reflected by the neck. The light receiver 202 is preferably, for example, a photodiode, a phototransistor, or other suitable light receiver. In the present preferred embodiment, a photodiode is used as the light receiver 202. The light receiver 202 is connected to the signal processor 31 and the detection signal (photoplethysmographic signal) obtained by the light receiver 202 is output to the signal processor 31.

Note that the light emitter 201 preferably outputs blue to yellow-green light with a wavelength of about 450 nm to about 580 nm. In the present preferred embodiment, the light emitter 201 outputs green light with a wavelength of about 525 nm, for example. Since blue to yellow-green light is highly absorbed in a living body, a large photoplethysmographic signal is able to be obtained. However, the blue to yellow-green light attenuates rapidly inside the living body, and a long optical path length cannot be obtained. In contrast, since near-infrared light is not highly absorbed in a living body, although a large photoplethysmographic signal cannot be obtained, a long optical path length is able to be obtained.

With the configuration described above, the photoplethysmographic sensor 20 having a short optical path length detects the photoplethysmographic signal in accordance with the blood flow in an arteriole or a capillary at a position relatively close to the outermost layer of skin (that is, a shallow position).

More particularly, in a case of the photoplethysmographic sensor 20 having a short optical path length, the photoplethysmographic signal includes little information of a wide carotid artery but includes a lot of information of an arteriole or a capillary. An arteriole is a narrow artery with a diameter of, for example, about 10 μm to about 100 μm and is a blood vessel between an artery and a capillary. Furthermore, a capillary is a narrow blood vessel with a diameter of, for example, about 5 μm to about 10 μm and connects an artery to a vein.

When the user wears the photoplethysmographic sensor 20, the photoplethysmographic sensor 20 is provided so as to be in contact with the neck at a position not directly over the carotid artery of the user. Accordingly, the photoplethysmographic sensor detects, for example, the photoplethysmographic signal in accordance with the blood flow in an arteriole or a capillary that branches from the carotid artery. Note that it is preferable that the photoplethysmographic sensor 20 is provided so as to be in contact with the left lateral side of the neck. In this case, for example, in a left lateral decubitus position, a right lateral decubitus position, or a supine position, the height of a left ventricle, which is a reference of blood pressure, and the height of the photoplethysmographic sensor 20 are equal or substantially equal to each other, and thus, a change in blood pressure is able to be stably measured regardless of the type of lying position. Since the left ventricle is slightly on the left side from the center of the chest, when the photoplethysmographic sensor 20 is provided on the left lateral side of the neck, a deviation between the left ventricle and the photoplethysmographic sensor 20 is reduced in the lateral direction. In addition, although the left ventricle is closer to the chest than to the back in the supine position, when the user is in the supine position without a pillow, the neck is in a lower position than the chest. Although depending on the height of the pillow, by disposing the photoplethysmographic sensor 20 on the left lateral side of the neck when using the pillow, the deviation in the height from the left ventricle in the supine position is able to be reduced.

In addition, the acceleration sensor 22 that detects a posture of the user (neck) while the pulse wave transit time is acquired is attached to the sensor portion 11. The acceleration sensor 22 is a 3-axis acceleration sensor that senses a direction in which a gravitational acceleration G is applied (i.e., a vertical direction). For example, whether the user is standing or lying is able to be determined from a detection signal of the acceleration sensor 22.

More specifically, the posture of the user is able to be determined by performing calibration beforehand with respect to a positional relationship between a body of the user and the acceleration sensor 22, and, for example, by performing coordinate transformation of an output of the acceleration sensor 22 on the assumption that the direction in which the gravitational acceleration is applied when the user is standing represents a downward direction (vertical direction). The acceleration sensor is also connected to the signal processor 31 and outputs a detection signal (3-axis acceleration data) to the signal processor 31. A gyro sensor, for example, may also be used instead of the acceleration sensor 22.

The photoplethysmographic sensor 20 and the acceleration sensor 22 are close to each other and are worn around the neck (nape) of the user in use (at the time of measurement). The photoplethysmographic sensor 20 and the acceleration sensor 22 to determine the posture are worn at the same portion in the above-described manner, and thus, correlation between the posture determination and the pulse wave transit time is able to be increased. In addition, by wearing them around the neck, not limbs, it is possible to estimate a blood pressure within a blood vessel in the neck, which is considered as having high correlation to the risk of cerebral stroke, cardiac infarction, or other conditions, not a blood pressure within a blood vessel in the limbs. In addition, since the plurality of sensors are collectively worn around the neck instead of being worn at separate portions, the intricacy in wearing is able to be reduced, and restrictions on daily activity of the user are also able to be reduced. The acceleration sensor 22 is preferably disposed near the photoplethysmographic sensor 20, but it may be disposed at another location inside the device insofar as having a structure in which a relative position to the photoplethysmographic sensor 20 is not changed.

In the sensor portion 11, the pressure sensor 23 that detects a pressure (stress) applied to the skin of the user is attached near the photoplethysmographic sensor 20. The pressure sensor 23 defines and functions as a pressure detector. For example, a force sensor or a strain sensor such as a piezoelectric sensor, a strain gauge, or other suitable sensor, or a sensor that detects deformation of a piezoelectric film may be used as the pressure sensor 23. When the pressure is low, it takes a long time for the pulse wave transit time to become stable. Therefore, the time to determine that the pulse wave transit time has entered a stable state is changed in accordance with the pressure.

A pressure adjuster 70 that adjusts the pressure of the photoplethysmographic sensor 20 to a predetermined value in accordance with the pressure detected by the pressure sensor 23 may further be added to the sensor portion 11. In this case, it is determined whether a measured pressure falls within an appropriate pressure range. If the measured pressure does not fall within the appropriate pressure range, a pressure adjustment signal is output to the pressure adjuster 70. More specifically, for example, in a case in which the detected pressure is low, a mechanism to cause the photoplethysmographic sensor 20 to protrude toward the neck side relative to the neck band 13 is included, a mechanism to reduce stretch of the neck band 13 is included, or an air bag is inflated by a pump so as to press the photoplethysmographic sensor 20 out to the neck side, so that the pressure is increased.

In addition, the sensor portion 11 (corresponding to a housing described in the Claims) is preferably structured so as to be elastically deformed (made of an elastic material, for example) such that a contact area with the neck of the user is changed in accordance with the pressure of the photoplethysmographic sensor 20. In this case, since the contact area between the sensor portion 11 and the skin of the user is changed in accordance with the pressure of the photoplethysmographic sensor 20, by increasing the contact area when the pressure is increased, for example, pain is able to be prevented, or indentations on the skin are able to be prevented.

Furthermore, a battery (illustration is omitted) that supplies electric power to the photoplethysmographic sensor 20, the signal processor 31, a wireless communication module 60, and other components is accommodated within the sensor portion 11. On the other hand, the signal processor 31 and the wireless communication module 60 are accommodated within the sensor portion 12. The wireless communication module 60 transmits biological information such as the blood pressure (blood pressure variations), the measured pulse wave transit time, the electrocardiographic signal, and the photoplethysmographic signal to an external apparatus.

As described above, each of the pair of electrocardiographic electrodes 15 and 15 and the photoplethysmographic sensor 20 is connected to the signal processor 31, and the detected electrocardiographic signal and photoplethysmographic signal are input to the signal processor 31. Furthermore, the acceleration sensor 22 and the pressure sensor 23 are also connected to the signal processor 31, and the detected 3-axis acceleration signal and pressure signal are input to the signal processor 31.

The signal processor 31 processes the input electrocardiographic signal and measures a heart rate, a heartbeat interval, or other parameters. The signal processor 31 further processes the input photoplethysmographic signal and measures a pulse rate, a pulse interval, or other parameters. In addition, the signal processor 31 measures the pulse wave transit time from a time difference between an R wave peak of the detected electrocardiographic signal and a rising point (peak) of the detected photoplethysmographic signal (or acceleration pulse wave). Subsequently, the signal processor 31 estimates the blood pressure (and/or blood pressure variations) of the user from the time-series data of the measured pulse wave transit time.

Accordingly, the signal processor 31 includes an electrocardiographic signal amplifier 311, a pulse wave signal amplifier 321, a first signal processor 310, a second signal processor 320, peak detectors 316 and 326, peak correctors 318 and 328, a pulse wave transit time measurer 330, a posture classifier 340, a pulse wave transit time variation acquirer 341, a time measurer 342, and a blood pressure estimator 344. The first signal processor 310 includes an analog filter 312, an A/D converter 313, and a digital filter 314, and the second signal processor 320 includes an analog filter 322, an A/D converter 323, a digital filter 324, and a second-order differentiation processor 325.

Among the above-described components, the digital filters 314 and 324, the second-order differentiation processor 325, the peak detectors 316 and 326, the peak correctors 318 and 328, the pulse wave transit time measurer 330, the posture classifier 340, the pulse wave transit time variation acquirer 341, the time measurer 342, and the blood pressure estimator 344 are preferably defined by a CPU that executes arithmetic processing, a ROM that stores programs and data to cause the CPU to execute various types of processing, a RAM that temporarily stores various types of data, such as results of the arithmetic processing, and other data. In other words, the functions of the above-described components are provided by the CPU executing the programs stored in the ROM.

The electrocardiographic signal amplifier 311 is defined by an amplifier using an operational amplifier, for example, and amplifies the electrocardiographic signal detected by the pair of electrocardiographic electrodes (conductive clothes) 15 and 15. The electrocardiographic signal amplified by the electrocardiographic signal amplifier 311 is output to the first signal processor 310. Similarly, the pulse wave signal amplifier 321 is defined by an amplifier using an operational amplifier, for example, and amplifies the photoplethysmographic signal detected by the photoplethysmographic sensor 20. The photoplethysmographic signal amplified by the pulse wave signal amplifier 321 is output to the second signal processor 320.

The first signal processor 310 includes the analog filter 312, the A/D converter 313, and the digital filter 314 as described above, and extracts a pulsatile component by executing a filtering process on the electrocardiographic signal amplified by the electrocardiographic signal amplifier 311.

The second signal processor 320 includes the analog filter 322, the A/D converter 323, the digital filter 324, and the second-order differentiation processor 325 as described above, and extracts a pulsatile component by executing a filtering process and a second-order differentiation process on the photoplethysmographic signal amplified by the pulse wave signal amplifier 321.

The analog filters 312 and 322 and the digital filters 314 and 324 perform filtering to remove components (noise) at frequencies other than the frequencies characterizing the electrocardiographic signal and the photoplethysmographic signal, and to increase an S/N ratio. More specifically, because frequency components from about 0.1 Hz to about 200 Hz are generally dominant in the electrocardiographic signal and frequency components from about 0.1 to several tens of Hz are generally dominant in the photoplethysmographic signal, the S/N ratio is increased by performing a filtering process by using the analog filters 312 and 322 and the digital filters 314 and 324, which are low pass filters, band pass filters, or other suitable filters, so as to cause only signals in the above-described frequency ranges to selectively pass therethrough.

In a case of extracting only the pulsatile component, components other than the pulsatile component may be cut by more restrictively narrowing a frequency pass band to improve noise immunity. Both types of the analog filters 312 and 322 and the digital filters 314 and 324 are not always required to be provided, and only one type of the analog filters 312 and 322 and the digital filters 314 and 324 may be provided in the configuration. The electrocardiographic signal having been subjected to the filtering process through the analog filter 312 and the digital filter 314 is output to the peak detector 316. Similarly, the photoplethysmographic signal having been subjected to the filtering process through the analog filter 322 and the digital filter 324 is output to the second-order differentiation processor 325.

The second-order differentiation processor 325 acquires a second-order differentiation pulse wave (acceleration pulse wave) through second-order differentiation of the photoplethysmographic signal. The acquired acceleration pulse wave signal is output to the peak detector 326. Because a change of a rising point of a photoplethysmographic pulse wave is not definite and is hard to detect in some cases, the peak is preferably detected after converting the photoplethysmographic pulse wave to an acceleration pulse wave. However, the second-order differentiation processor 325 is not necessarily provided, and may be omitted from the configuration.

The peak detector 316 detects the peak (R wave) of the electrocardiographic signal that has been subjected to the signal processing in the first signal processor 310 (from which the pulsatile component has been extracted). On the other hand, the peak detector 326 detects the peak of the photoplethysmographic signal (acceleration pulse wave) that has been subjected to the filtering process in the second signal processor 320. The peak detector 316 and the peak detector 326 perform peak detection within normal ranges of the heartbeat interval and the pulse interval, and store information such as peak time and peak amplitude for all of the detected peaks in the RAM, for example.

The peak corrector 318 determines a delay time of the electrocardiographic signal in the first signal processor 310 (i.e., the analog filter 312, the A/D converter 313, and the digital filter 314). Based on the determined delay time of the electrocardiographic signal, the peak corrector 318 corrects the peak of the electrocardiographic signal, which has been detected by the peak detector 316. Similarly, the peak corrector 328 determines a delay time of the photoplethysmographic signal in the second signal processor 320 (the analog filter 322, the A/D converter 323, the digital filter 324, and the second-order differentiation processor 325). Based on the determined delay time of the photoplethysmographic signal, the peak corrector 328 corrects the peak of the photoplethysmographic signal (acceleration pulse wave), which has been detected by the peak detector 326. The corrected peak of the electrocardiographic signal and the corrected peak of the photoplethysmographic signal (acceleration pulse wave) are output to the pulse wave transit time measurer 330. The peak corrector 318 is not necessarily provided, and may be omitted from the configuration.

The pulse wave transit time measurer 330 acquires a pulse wave transit time in a time-series manner from an interval (time difference) between the R wave peak of the electrocardiographic signal having been corrected by the peak corrector 318 and the peak of the photoplethysmographic signal (acceleration pulse wave) having been corrected by the peak corrector 328. That is, the pulse wave transit time measurer 330 defines and functions as pulse wave transit time acquirer.

The pulse wave transit time measurer 330 calculates, in addition to the pulse wave transit time, for example, the heart rate, the heartbeat interval, a change rate of the heartbeat interval, or other parameters from the electrocardiographic signal. Similarly, the pulse wave transit time measurer 330 further calculates the pulse rate, the pulse interval, a change rate of the pulse interval, or other parameters from the photoplethysmographic signal (acceleration pulse wave). The time-series data of the acquired pulse wave transit time is output to the posture classifier 340.

The posture classifier 340 determines (estimates) the posture of the user based on the detection signal (i.e., the 3-axis acceleration data) from the acceleration sensor 22, and based on the determined posture, classifies the time-series data of the pulse wave transit time according to the posture. More specifically, the posture classifier 340 classifies the time-series data of the pulse wave transit time into postures including at least an upright position, an inverted position, a supine position, a left lateral decubitus position, a right lateral decubitus position, and a prone position.

The pulse wave transit time variation acquirer 341 determines variations in the pulse wave transit time based on the time-series data of the pulse wave transit time having been classified according to the posture by the posture classifier 340.

More specifically, for example, the pulse wave transit time variation acquirer 341 sets a posture (e.g., the supine position) as a reference from among the classified postures, and corrects, in conformity with the reference posture, the time-series data of the pulse wave transit time having been classified into the postures (e.g., the upright position, the inverted position, the left lateral decubitus position, the right lateral decubitus position, and the prone position) different from the reference posture. Subsequently, based on both of the time-series data of the pulse wave transit time in the reference posture and the corrected time-series data of the pulse wave transit time (after the correction), the pulse wave transit time variation acquirer 341 determines the variations in the pulse wave transit time.

At this time, the pulse wave transit time variation acquirer 341 sets, as the reference posture, the posture (e.g., the supine position) in which a time of the time-series data of the acquired pulse wave transit time is the longest. Subsequently, the pulse wave transit time variation acquirer 341 corrects the time-series data of the pulse wave transit time for each posture such that a correlation coefficient of an approximation curve resulting from approximating the time-series data of the pulse wave transit time for each posture with a curve is increased (preferably, maximized) to obtain variations in the pulse wave transit time from the corrected time-series data. Thus, by correcting the pulse wave transit time for each posture in a manner to increase the correlation coefficient of the approximation curve and estimate a trend of the variations in the pulse wave transit time from the corrected time-series data, the trend of the variations in the pulse wave transit time (trend of the variations in the blood pressure) for a long time are able to be estimated without intricate calibration even when the posture is changed. For example, the least square method is able to be used as a method of determining the above-described approximation curve.

Instead of the above-described manner, the time-series data items of the pulse wave transit time for each posture may be arrayed, and an approximation curve may be determined for each of the data items. In this case, although a plurality of approximation curves are calculated, from among the approximation curves of postures with a predetermined time or more, an approximation curve having a high correlation coefficient is selected. The data acquired by the pulse wave transit time variation acquirer 341 and representing the variations in the pulse wave transit time is output to the blood pressure estimator 344.

The time measurer 342 measures a time elapsed from start of measurement of the pulse wave transit time, in other words, a time elapsed from start of acquisition of the electrocardiographic signal and the photoplethysmographic signal. That is, the time measurer 342 defines and functions as a time measurer. Note that the elapsed time measured by the time measurer 342 is output to the blood pressure estimator 344.

Based on the data representing variations in the corrected pulse wave transit time and the predetermined relationship (correlation formula) between the pulse wave transit time and the blood pressure, the blood pressure estimator 344 estimates the blood pressure (and/or blood pressure variations). In this case, after the time elapsed from the start of measurement of the pulse wave transit time has become a predetermined time or more (after a predetermined time has elapsed), the blood pressure estimator 344 estimates the blood pressure (and/or blood pressure variation). That is, the blood pressure estimator 344 defines and functions as a blood pressure estimator. Note that the predetermined time is set in accordance with the time from when the measurement is started to when the pulse wave transit time becomes stable.

Figure 3:
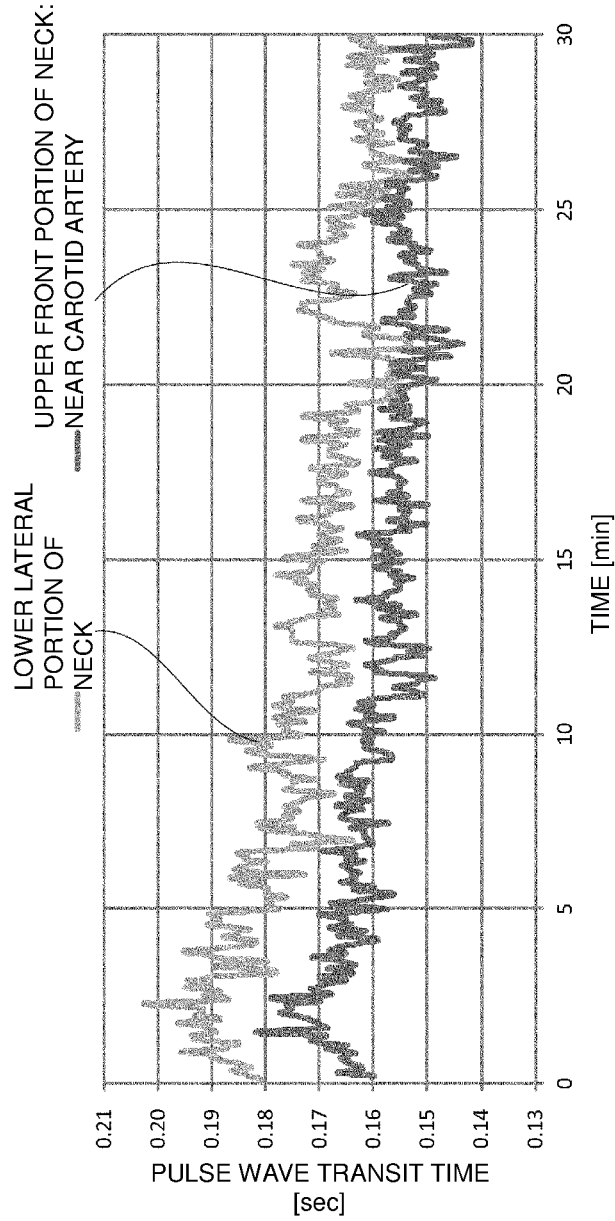
FIG. 3 illustrates an example of a temporal change of the pulse wave transit time based on an electrocardiogram at a neck and a photoplethysmographic pulse wave of an arteriole or a capillary.

When the pulse wave is measured at an arteriole or a capillary near the carotid artery, it takes time for the length of the arteriole or capillary that branches from the carotid artery, and thus, the pulse wave transit time is increased from the value measured at the carotid artery. Here, FIG. 3 illustrates an example of a temporal change of the pulse wave transit time based on an electrocardiogram at the neck and a photoplethysmographic pulse wave of an arteriole or a capillary. As illustrated in FIG. 3, when a pressure is applied, the pressure of the arteriole or capillary is gradually increased, and the pulse wave transit time is decreased to approach the value at the carotid artery and then becomes stable. In addition, the temporal change of the pulse wave transit time is the same or substantially the same even if the pulse wave measurement position differs. Note that an upper front portion of the neck is near the carotid artery, and the arteriole or capillary that branches from the carotid artery is short, and thus, the pulse wave transit time is generally short compared with that in a lower lateral side portion of the neck.

Figure 4:
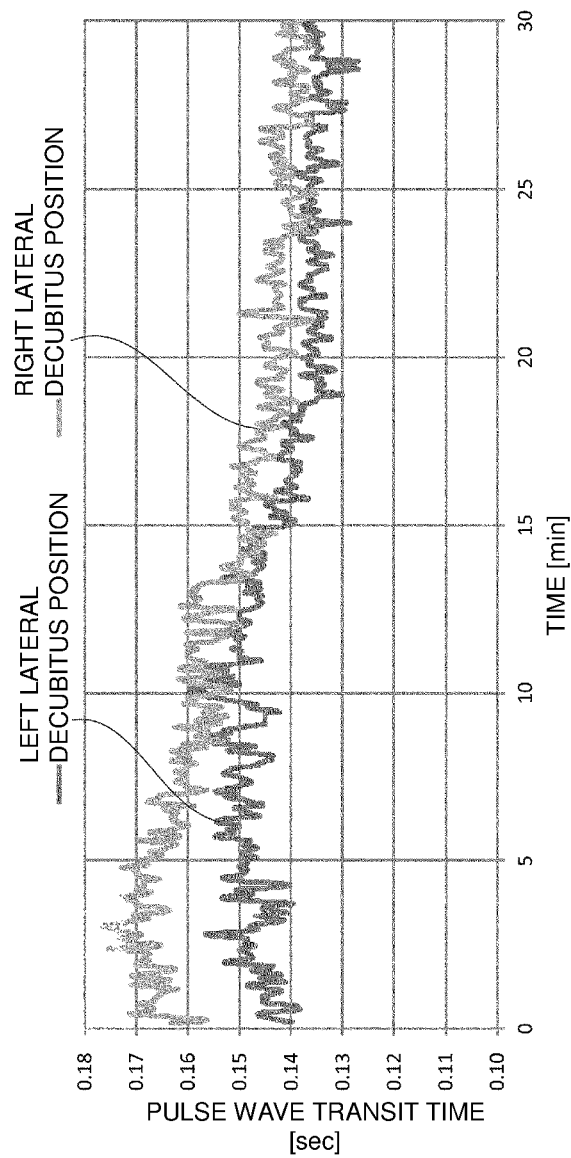
FIG. 4 illustrates a difference in pulse wave transit times based on electrocardiograms and photoplethysmographic pulse waves of an arteriole or a capillary in a left lateral decubitus position and a right lateral decubitus position in a case where a photoplethysmographic sensor is arranged on a left lateral side of the neck.

Furthermore, the temporal change (the amount of change, the rate of change) of the pulse wave transit time varies according to the posture. Now, FIG. 4 illustrates a difference in temporal change of pulse wave transit times (in a left lateral decubitus position and a right lateral decubitus position) based on electrocardiograms and photoplethysmographic pulse waves of an arteriole or a capillary in the left lateral decubitus position and the right lateral decubitus position in a case in which the photoplethysmographic sensor 20 is disposed on the left lateral side of the neck. The photoplethysmographic sensor 20 is disposed to be in contact with the left lateral side of the neck, and the left ventricle and the pulse wave sensor are located at the same or substantially the same height both in the left lateral decubitus position and the right lateral decubitus position. Thus, when a sufficient time has passed, two pulse wave transit times reach the same or substantially the same value. In a case in which measurement is performed in an upper portion of the neck (right lateral decubitus position), the initial pulse wave transit time is long, and the amount of decrease is also large. Therefore, the blood pressure of an arteriole at a vertically upper portion of the body is lower than that at a vertically lower portion. When the pressure is applied, the blood pressure of an arteriole or a capillary increases.

Figure 8:
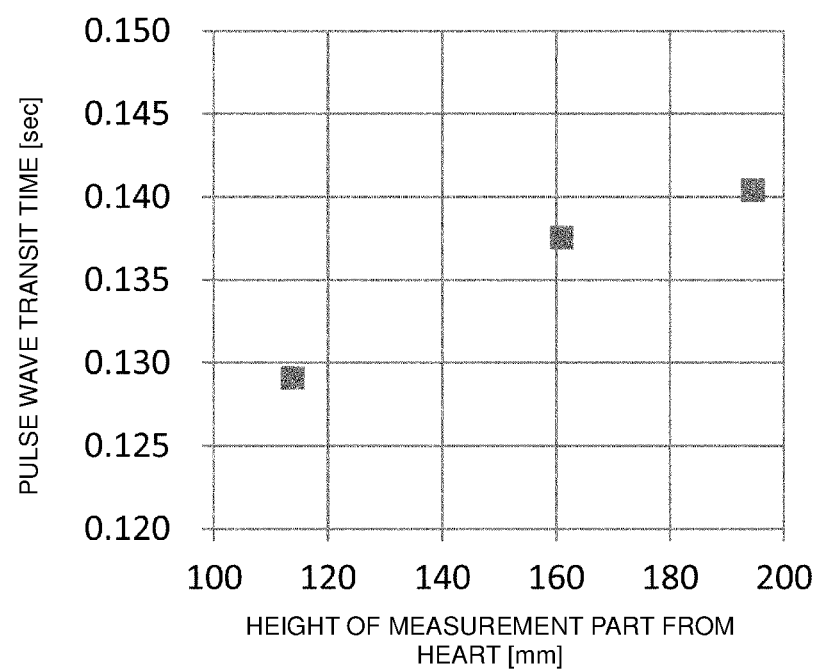
FIG. 8 illustrates an example of a change in pulse wave transit time depending on a change in the height of a measurement portion from the height of a heart.

When the height of the measurement portion becomes about 100 mm lower from the height of the heart, the blood pressure increases by about 7.8 mmHg because of the density of mercury and blood. According to experimental results, the pulse wave transit time is decreased by about 0.014 [sec] as illustrated in FIG. 8. The thickness of the neck is about 100 mm, and if the photoplethysmographic sensor is disposed to be in contact with the right lateral side of the neck, the height from the left ventricle changes by about 200 mm between the left lateral decubitus position and the right lateral decubitus position. Thus, when a sufficient time has passed, a difference of about 0.028 [sec] is generated in the pulse wave transit time. Note that the difference in the pulse wave transit time varies due to variations in the thickness of the neck, the posture, and the contact position. Thus, the smaller the pulse wave transit time difference is (the smaller the height from the left ventricle is), the smaller the variations are. Accordingly, by disposing the photoplethysmographic sensor 20 so as to be in contact with the left lateral side of the neck, a more accurate pulse wave transit time difference is measured.

As described above, after the predetermined time has elapsed from the start of measurement of the pulse wave transit time (i.e., after the pulse wave transit time has become stable), by estimating the blood pressure (and/or blood pressure variations), a more accurate blood pressure (and/or blood pressure variations) is able to be estimated. Here, for example, the blood pressure estimator 344 estimates the blood pressure variations based on a correlation formula that has been obtained in advance, the correlation formula being a correlation formula between the pulse wave transit time in the reference posture (e.g., in a supine position) and the blood pressure, and thus, the blood pressure (or its variations) is able to be estimated from the variations in the corrected pulse wave transit time. Note that the correlation formula between the pulse wave transit time and the blood pressure may be obtained for a posture other than the supine position or may be obtained for each of a plurality of postures. Note that, when estimating the blood pressure (and/or blood pressure variations) based on the pulse wave transit time, the blood pressure estimator 344 preferably changes the above correlation formula (transformation) (or a constant thereof) in accordance with the pressure of the photoplethysmographic sensor 20.

Furthermore, based on the estimated blood pressure variations, the blood pressure estimator 344 performs classification into the dipper type, the non-dipper type, the riser type, and the extreme-dipper type. In a normal case, the blood pressure variations exhibit the dipper type in which the blood pressure decreases during sleeping hours. On the other hand, in a case of hypertensive patients, the blood pressure at night is high or does not decrease (i.e., the riser type or the non-dipper type), and the risk of cerebral stroke, cardiac infarction, or other condition increases. In a case of patients taking antihypertensive drugs, the blood pressure may decrease excessively during sleeping hours (i.e., the extreme-dipper type), and the risk of cerebral stroke, cardiac infarction, or other condition may increase occasionally. Thus, the determination regarding the riser type, the non-dipper type, and the extreme-dipper type is able to be made by obtaining the blood pressure variations during sleeping hours.

In a state in which the user wears the device, the blood pressure estimator 344 may perform calibration beforehand for the determination of the posture, that is, calibration of a relationship between an output signal (in the vertical direction) of the acceleration sensor 22 and the posture of the user (e.g., the upright position or the supine position), may determine a relational expression between a deviation in angle (i.e., a deviation angle) from the reference posture and a height from the heart to a pulse-wave measurement portion (i.e., a portion at which the photoplethysmographic sensor 20 is worn), and may store the relational expression in a memory, such as a RAM. When measuring the pulse wave transit time (i.e., in use), the blood pressure estimator 344 may calculate, based on a result of the calibration performed beforehand, a deviation in angle (deviation angle) between the posture of the user sensed by the acceleration sensor 22 and the reference posture. When calculating the blood pressure from the pulse wave transit time, the blood pressure estimator 344 may determine the height from the heart to the pulse-wave measurement portion (i.e., the portion at which the photoplethysmographic sensor 20 is worn) based on both of the calculated deviation in angle (deviation angle) and the above-described relational expression stored beforehand, and may correct the blood pressure in accordance with the determined height.

Measurement data including not only the estimated blood pressure and blood pressure variations, but also the calculated pulse wave transit time, the heart rate, the heartbeat interval, the pulse rate, the pulse interval, the photoplethysmographic pulse wave, the acceleration pulse wave, and the 3-axis accelerations is output to, for example, the memory such as the RAM, or to the wireless communication module 60. The measurement data may be stored in the memory to be readable together with a daily variation history, or may be wirelessly transmitted in real time to an external device, such as a personal computer (PC) or a smartphone. Alternatively, the measurement data may be stored in the memory inside the device during the measurement, and may be transmitted to an external device by automatically connecting the relevant device to the external device after the end of the measurement.

Figure 5:
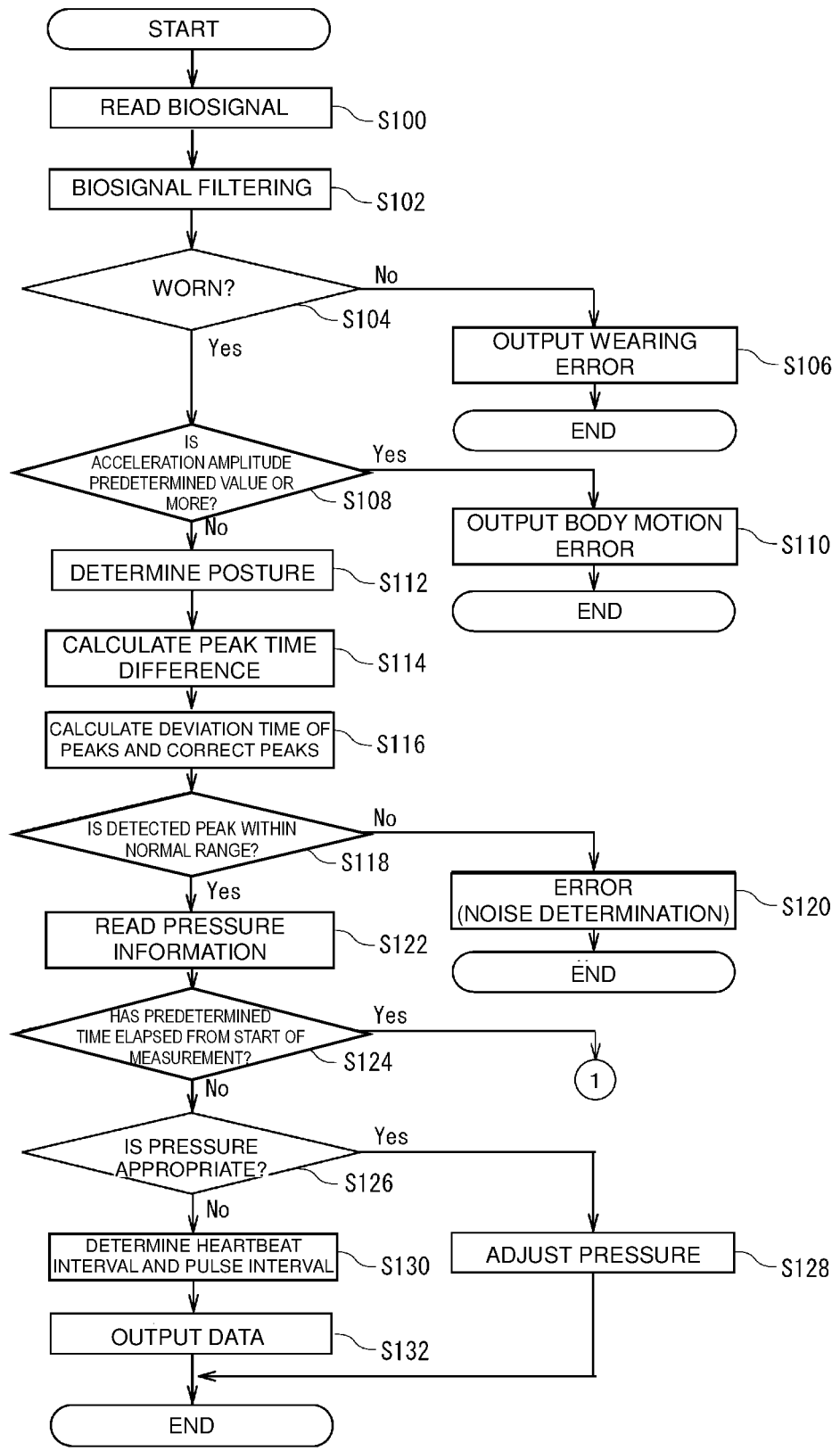
FIG. 5 is a flowchart illustrating processing procedures of a blood pressure estimation process performed by the blood pressure estimating device according to the first preferred embodiment of the present invention (first page).
Figure 6:
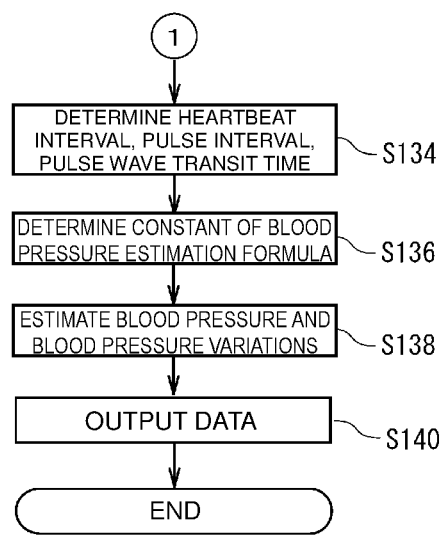
FIG. 6 is a flowchart illustrating processing procedures of the blood pressure estimation process performed by the blood pressure estimating device according to the first preferred embodiment of the present invention (second page).

Next, the operation of the blood pressure estimating device 1 will be described below with reference to FIG. 5 and FIG. 6. FIG. 5 and FIG. 6 are each a flowchart illustrating processing procedures of a blood pressure estimation process performed by the blood pressure estimating device 1. The process illustrated in FIG. 5 and FIG. 6 is repeatedly performed at predetermined timing mainly by the signal processor 31.

When the blood pressure estimating device 1 is worn around the neck such that the sensor portions 11 and 12 (the electrocardiographic electrodes 15 and 15 and the photoplethysmographic sensor 20) are in contact with the neck, in step S100, an electrocardiographic signal detected by the pair of electrocardiographic electrodes 15 and 15 and a photoplethysmographic signal detected by the photoplethysmographic sensor 20 are read. In the subsequent step S102, a filtering process is performed on the electrocardiographic signal and the photoplethysmographic signal that have been read in step S100. Furthermore, an acceleration pulse wave is acquired through second differentiation of the photoplethysmographic signal.

Subsequently, in step S104, for example, a wearing state of the blood pressure estimating device 1 is determined based on an amount of light received by the photoplethysmographic sensor 20. That is, in the photoplethysmographic sensor 20, light emitted from the light emitter 201 and returned after passing through or being reflected by a living body is received by the light receiver 202, and a change in the amount of the light is detected as the photoplethysmographic signal. Therefore, the amount of the received signal light is reduced in the state in which the device is not properly worn. Taking the above point into account, in step S104, it is determined whether the amount of the received light is greater than or equal to a predetermined value. If the amount of the received light is greater than or equal to the predetermined value, the process proceeds to step S108. On the other hand, if the amount of the received light is less than the predetermined value, this is determined to be a wearing error, and wearing error information (warning information) is output in step S106. Subsequently, the process is brought to an end. Instead of the above-described method of using the amount of the light received by the photoplethysmographic sensor 20, it is also possible to use, for example, another method of using an amplitude of the photoplethysmographic signal, a level of stability of the baseline of an electrocardiographic waveform, or a ratio of a noise frequency component.

In step S108, it is determined whether an acceleration of the neck detected by the acceleration sensor 22 is greater than or equal to a predetermined threshold value (i.e., whether the neck is moved and body motion noise is increased). If the acceleration of the neck is less than the predetermined threshold value, the process proceeds to step S112. On the other hand, if the acceleration of the neck is greater than or equal to the predetermined threshold value, body motion error information is output in step S110, and then the process is brought to an end.

In step S112, the posture of the user (measurement part) is determined based on the 3-axis acceleration data. In the subsequent step S114, peaks of the electrocardiographic signal and the photoplethysmographic signal (acceleration pulse wave signal) are detected. Subsequently, a time difference (peak time difference) between the detected R wave peak of the electrocardiographic signal and the detected peak of the photoplethysmographic signal (acceleration pulse wave) is calculated.

Subsequently, in step S116, respective delay times (deviations) of the R wave peak of the electrocardiographic signal and the peak of the photoplethysmographic signal (acceleration pulse wave) are determined, and the time difference (peak time difference) between the R wave peak of the electrocardiographic signal and the peak of the photoplethysmographic signal (acceleration pulse wave) is corrected based on the determined delay times.

Subsequently, in step S118, it is determined whether the peak time difference corrected in step S116 falls within a predetermined time range (e.g., greater than or equal to about 0.01 sec. and less than or equal to about 0.3 sec.). If the peak time difference falls within the predetermined time range, the process proceeds to step S122. On the other hand, if the peak time difference does not fall within the predetermined time range, error information (noise determination) is output in step S120, and then the process is brought to an end.

In step S122, pressure information is read from the pressure sensor 23. Subsequently, in step S124, it is determined whether a predetermined time or more has elapsed from the start of measurement, that is, whether the pulse wave transit time has become stable. If the predetermined time has elapsed (if it is determined that the pulse wave transit time has become stable), the process proceeds to step S134. On the other hand, if the predetermined time has not elapsed (if it is determined that the pulse wave transit time has not become stable), the process proceeds to step S126.

In step S126, it is determined whether the pressure is appropriate (whether the pressure falls within a predetermined range). If the pressure is not appropriate, the pressure is adjusted in step S128, and then the process proceeds to step S134. On the other hand, if the pressure is appropriate, the pressure is maintained, and the process proceeds to step S130.

In step S130, data such as a heartbeat interval or a pulse interval, for example, (data other than the pulse wave transit time and the blood pressure/blood pressure variation estimated value) is determined. Subsequently, the determined data is output in step S132, and then the process is brought to an end.

If the predetermined time has elapsed from the start of measurement (if it is determined that the pulse wave transit time has become stable), in step S134, data such as the heartbeat interval, the pulse interval, and the pulse wave transit time, for example, is determined. Subsequently, in step S136, a constant of a blood pressure transformation (correlation formula between the pulse wave transit time and the blood pressure) is determined. Subsequently, in step S138, the blood pressure is estimated, and the blood pressure variation state is estimated, for example. Subsequently, in step S140, the acquired blood pressure, its variation information, and other parameters are, for example, output to an external device such as a memory or a smartphone. Subsequently, the process is brought to an end.

As described above in detail, according to the present preferred embodiment, since the photoplethysmographic sensor 20 acquires the photoplethysmographic signal of an arteriole or a capillary, the photoplethysmographic sensor 20 is not necessarily provided directly over the carotid artery. In addition, a stable photoplethysmographic signal is able to be acquired even if the position of the photoplethysmographic sensor 20 deviates. In addition, as described above, when the pulse wave transit time is measured at an arteriole or a capillary, the pulse wave transit time changes at an initial stage of measurement. However, according to the present preferred embodiment, the time elapsed from the start of acquisition of the pulse wave transit time (time elapsed from the start of measurement of the electrocardiographic signal and the photoplethysmographic signal) is measured, and after the elapsed time has become the predetermined time or more (after the predetermined time has elapsed), the blood pressure is estimated. Accordingly, the blood pressure is able to be estimated after the pulse wave transit time has become stable, and an accurate blood pressure is able to be estimated. As a result, without adjusting the position of the photoplethysmographic sensor to the carotid artery, and even if the position of the photoplethysmographic sensor 20 deviates (even if the position is changed), the blood pressure (and/or blood pressure variations) is able to be estimated by measuring a stable and accurate pulse wave transit time.

In particular, according to the present preferred embodiment, when the pulse wave transit time is acquired, the photoplethysmographic sensor 20 is in contact with the neck at a position not directly over the carotid artery of the user. Thus, the photoplethysmographic signal of an arteriole or a capillary away from the carotid artery is able to be detected, and based on the photoplethysmographic signal and R wave (peak) of the electrocardiographic signal, the pulse wave transit time between the heart and the arteriole or capillary is able to be acquired. Accordingly, without adjusting the position of the photoplethysmographic sensor 20 to the carotid artery, and even if the position of the photoplethysmographic sensor 20 deviates (even if the position is changed), the blood pressure (and/or blood pressure variations) is able to be estimated by measuring a stable and accurate pulse wave transit time.

In a case in which a sensor is disposed directly over the carotid artery, the carotid artery might be strongly pressed in the following cases: the sensor is strongly pressed onto the carotid artery when a user positions the sensor; a device including the sensor is strongly pressed onto a pillow when the user tosses and turns while wearing the device; and the device is strongly impacted by the user's hand, a corner of a desk, or other force when the user falls down. For example, in a case in which any plaque is present in the carotid artery, when the carotid artery is strongly pressed, the plaque may be separated and flow into a cerebrovascular vessel from the carotid artery. If the plaque clogs the cerebrovascular vessel, encephalopathy such as cerebral infarction might possibly be caused. Accordingly, the sensor is preferably disposed at a position not directly over the carotid artery. Since the pulse wave transit time differs in the carotid artery and a surrounding arteriole or capillary, when measurement is performed near the carotid artery, a slight deviation may result in two cases: a case in which a pulse wave at the carotid artery is mainly measured; and a case in which a pulse wave at the arteriole or capillary is mainly measured. That is, a measurement value of the pulse wave transit time may largely differ. In contrast, according to the present preferred embodiment, by disposing the sensor at a position not directly over the carotid artery, the dependency of the pulse wave transit time on the measurement position is able to be reduced.

According to the present preferred embodiment, the photoplethysmographic sensor 20 is in contact with the left lateral side of the neck. Accordingly, for example, in a left lateral decubitus position, a right lateral decubitus position, or a supine position, the height of a left ventricle, which is a reference of blood pressure, and the height of the photoplethysmographic sensor 20 become equal or substantially equal to each other, and thus, a change in blood pressure is able to be stably measured regardless of the lying position. Since the left ventricle is slightly on the left lateral side from the center of the chest, when the photoplethysmographic sensor 20 is provided on the left lateral side of the neck, a deviation between the left ventricle and the photoplethysmographic sensor 20 is reduced in the lateral direction. Furthermore, although the left ventricle is closer to the chest than to the back in the supine position, when the user is in the supine position without a pillow, the neck is in a lower position than the chest. Although depending on the height of the pillow, by disposing the photoplethysmographic sensor 20 on the left lateral side of the neck when using the pillow, the deviation in the height from the left ventricle in the supine position is able to be reduced. Accordingly, the blood pressure estimation does not need any correction or only needs a simple correction.

The time before the pulse wave transit time becomes stable and the value at the time the pulse wave transit time becomes stable change depending on the pressure of the photoplethysmographic sensor 20. That is, the change after the start of measurement of the pulse wave transit time at the arteriole or capillary is influenced by the pressure of the photoplethysmographic sensor 20. However, according to the present preferred embodiment, the pressure of the photoplethysmographic sensor 20 is measured, and in accordance with the pressure, a constant of the transformation (correlation formula) between the pulse wave transit time and the blood pressure is changed. Thus, a more accurate blood pressure is able to be estimated.

In addition, according to the present preferred embodiment, a mechanism that adjusts the pressure in accordance with the measured pressure is able to maintain the pressure at an optimal value. Thus, a more accurate blood pressure is able to be estimated.

According to the present preferred embodiment, the sensor portion 11 in which the photoplethysmographic sensor 20 is attached is elastically deformed such that a contact area with the neck of the user is changed in accordance with the pressure of the photoplethysmographic sensor 20. That is, the contact area between the sensor portion 11 and the skin of the user is changed in accordance with the pressure of the photoplethysmographic sensor 20. Thus, by increasing the contact area when the pressure is increased, for example, pain is able to be prevented, or indentations on the skin are able to be prevented.

According to the present preferred embodiment, the light emitter 201 outputs blue to yellow-green light. Note that the blue to yellow-green light (e.g., light with a wavelength of about 450 nm to about 580 nm) is likely to be absorbed in a living body unlike near-infrared light (e.g., light with a wavelength of about 800 nm to about 1000 nm). Thus, by using a light source of the blue to yellow-green light (the photoplethysmographic sensor 20) as the light emitter 201 (the photoplethysmographic sensor 20), the light is unlikely to reach the carotid artery beneath the skin. Accordingly, even if the photoplethysmographic sensor 20 is disposed directly over the carotid artery, the photoplethysmographic signal in accordance with the blood flow in an arteriole or a capillary near the carotid artery, not in the carotid artery, is able to be acquired.

Second Preferred Embodiment

In the above-described first preferred embodiment, estimation of the blood pressure is started when the predetermined time or more has elapsed after the start of estimation on the assumption that the pulse wave transit time has become stable. However, it is also possible to directly determine whether the pulse wave transit time has become stable, and when it is determined that the pulse wave transit time has become stable, estimation of the blood pressure is able to be started.

Figure 7:
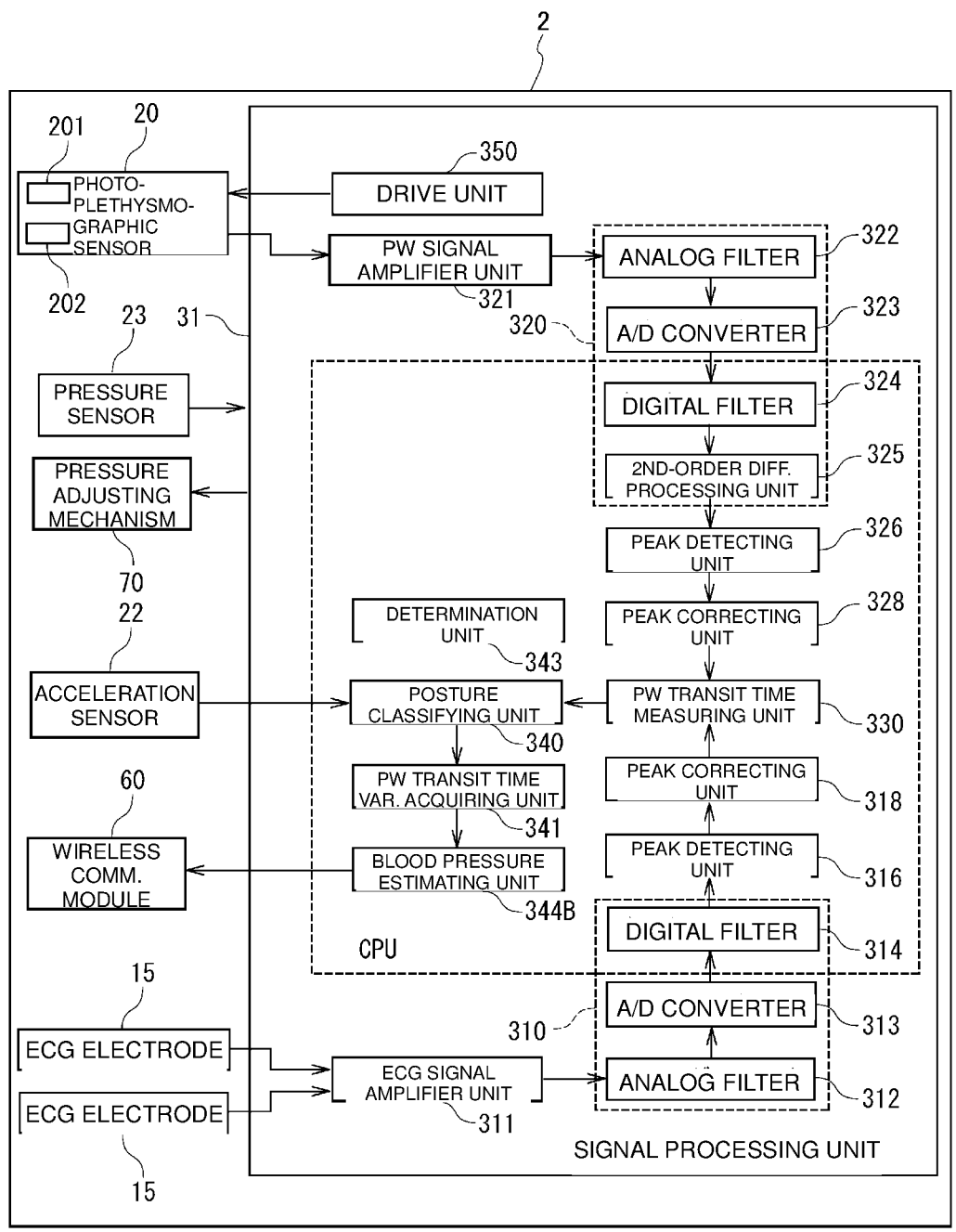
FIG. 7 is a block diagram illustrating a configuration of a blood pressure estimating device using a pulse wave transit time according to a second preferred embodiment of the present invention.

Thus, a blood pressure estimating device 2 according to a second preferred embodiment of the present invention will be described next with reference to FIG. 7. Description of the same or substantially the same configuration as that in the first preferred embodiment described above will be simplified or omitted below, and different points will mainly be described. FIG. 7 is a block diagram illustrating a configuration of the blood pressure estimating device 2 using the pulse wave transit time. Note that the same reference numerals are used in FIG. 7 for the same or substantially the same components as those in the first preferred embodiment.

The blood pressure estimating device 2 differs from the blood pressure estimating device 1 according to the first preferred embodiment described above in that the signal processor 31 includes a determiner 343, instead of the time measurer 342, and a blood pressure estimator 344B, instead of the blood pressure estimator 344. Note that the remaining configuration is the same or substantially the same as that of the blood pressure estimating device 1 described above, and thus, a detailed description thereof will be omitted below.

After the measurement of the pulse wave transit time has been started, the determiner 343 determines whether the pulse wave transit time has become stable. That is, the determiner 343 defines and functions as a determiner. More specifically, for example, when a state in which a time change rate of the pulse wave transit time is lower than or equal to a predetermined value is continued for a predetermined period of time or more, the determiner 343 determines that the pulse wave transit time has become stable. Alternatively, the determiner 343 may determine that the pulse wave transit time has become stable when a decrease amount (or decrease rate) from the pulse wave transit time at the start of measurement reaches a predetermined decrease amount (or decrease rate) of the pulse wave transit time. Note that a determination result (as to whether the pulse wave transit time has become stable) obtained by the determiner 343 is output to the blood pressure estimator 344B.

After the determiner 343 has determined that the pulse wave transit time has become stable, the blood pressure estimator 344B estimates the blood pressure (and/or blood pressure variation) based on the pulse wave transit time and a predetermined relationship between the pulse wave transit time and the blood pressure. Note that the remaining configuration is the same or substantially the same as that in the first preferred embodiment described above, and thus, a detailed description thereof will be omitted below.

According to the present preferred embodiment, after the acquisition of the pulse wave transit time has been started, it is determined whether the pulse wave transit time has become stable. After it has been determined that the pulse wave transit time has become stable, the blood pressure (and/or blood pressure variation) is estimated. Accordingly, the blood pressure and/or blood pressure variation is able to be estimated after the pulse wave transit time has become stable, and an accurate blood pressure and/or blood pressure variation is able to be estimated. As a result, as in the above-described first preferred embodiment, without adjusting the position of the photoplethysmographic sensor 20 to the carotid artery, and even if the position of the photoplethysmographic sensor 20 deviates (even if the position is changed), the blood pressure (and/or blood pressure variations) is able to be estimated by measuring a stable and accurate pulse wave transit time.

Although the preferred embodiments of the present invention have been described in detail above, the present invention is not limited to the above-described preferred embodiments, and various modifications may be made. For instance, although the above-described preferred embodiments have described an example of the blood pressure estimating device 1 is a neck band in which the neck band 13 is worn around the neck of the user, the blood pressure estimating device may be bonded to the neck of the user on the backside over a range spanning from one lateral side of the neck to the other lateral side for use.

Although, in the above-described preferred embodiments, the predetermined transformation (correlation formula) between the pulse wave transit time and the blood pressure is used to estimate the blood pressure (and/or blood pressure variations) from the pulse wave transit time (variations), a conversion table specifying a relationship between the pulse wave transit time and the blood pressure for each posture may be used instead of the correlation formula.

In addition, for example, a biological sensor, such as an oxygen saturation sensor, a sound sensor (microphone), a displacement sensor, a temperature sensor, or a humidity sensor, for example, may be used in addition to the above-described sensors.

Although, in the above-described preferred embodiments, the signal processor 31 performs processes such as the determination of the posture, the correction of the pulse wave transit time for each posture, and the estimation of the blood pressure (and/or blood pressure variations), the acquired data including the electrocardiographic signal, the photoplethysmographic signal, and the 3-axis accelerations may be wirelessly output to a personal computer (PC) or a smartphone, for example, and the PC or the smartphone may perform processes such as the determination of the posture, the correction of the pulse wave transit time for each posture, and the estimation of the blood pressure (and/or blood pressure variations). In that case, the above-described data such as the correlation formula is stored in the PC or the smartphone.

Furthermore, an input to receive an operation of inputting a height or sitting height of the user may further be provided. Based on the height or sitting height of the user, by using a predetermined correlation formula between the height or sitting height and the length of an artery between the aortic valve and the neck (carotid artery), the length of the artery between the aortic valve and the neck (carotid artery) may be obtained, and the blood pressure may be corrected in accordance with the length of the artery. In this case, the length of the artery between the aortic valve and the neck (carotid artery) is obtained based on the received height or sitting height of the user, and the blood pressure and/or blood pressure variation is corrected in accordance with the length of the artery. Thus, a more accurate blood pressure or other characteristics is able to be estimated.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A blood pressure estimating device comprising:
   an electrocardiogramactrode that detects an electrocardiogramal;
   a photoplethysmographic sensor that includes a light emitter and a light receiver and that acquires a photoplethysmographic signal of an arteriole or a capillary;
   a pulse wave transit time acquirer that acquires a pulse wave transit time based on the electrocardiogramal detected by the electrocardiogramd the photoplethysmographic signal detected by the photoplethysmographic sensor;
   a time measurer that measures a time elapsed from start of acquisition of the pulse wave transit time by the pulse wave transit time acquirer; and
   a blood pressure estimator that estimates a blood pressure based on the acquired pulse wave transit time and a predetermined relationship between the pulse wave transit time and the blood pressure; wherein
   the blood pressure estimator estimates the blood pressure after the elapsed time measured by the time measurer has become a predetermined time or more; and
   the electrocardiogramactrode and the photoplethysmographic sensor are configured to detect the electrocardiogramal and acquire the photoplethysmographic signal at a same portion of a user's body.

2. The blood pressure estimating device according to claim 1, wherein, when the pulse wave transit time acquirer acquires the pulse wave transit time, the photoplethysmographic sensor is disposed so as to be in contact with a neck of a user at a position not directly over a carotid artery.

3. The blood pressure estimating device according to claim 1, wherein, when the pulse wave transit time acquirer acquires the pulse wave transit time, the photoplethysmographic sensor is disposed so as to be in contact with a neck of the user on a left lateral side of the neck.

4. The blood pressure estimating device according to claim 1, further comprising:
   a pressure detector that detects a pressure of the photoplethysmographic sensor; wherein
   the blood pressure estimator changes, in accordance with the pressure detected by the pressure detector, a transformation to be used when the blood pressure is calculated from the pulse wave transit time.

5. The blood pressure estimating device according to claim 4, further comprising:
   a pressure adjuster that adjusts the pressure to a predetermined value in accordance with the pressure of the photoplethysmographic sensor detected by the pressure detector.

6. The blood pressure estimating device according to claim 1, wherein a housing to which the photoplethysmographic sensor is attached is elastically deformable such that a contact area with a neck of the user is changed in accordance with the pressure of the photoplethysmographic sensor.

7. The blood pressure estimating device according to claim 1, wherein the light-emitting element outputs blue to yellow-green light.

8. The blood pressure estimating device according to claim 1, further comprising:
   an input that receives an operation of inputting a height or a sitting height of the user; wherein
   the blood pressure estimator obtains a length of an artery between an aortic valve and the carotid artery based on the height or sitting height received by the input and corrects the blood pressure in accordance with the length of the artery.

9. A blood pressure estimating device comprising:
   an electrocardiogramalectrode that detects an electrocardiogramal;
   a photoplethysmographic sensor that includes a light emitter and a light receiver and that acquires a photoplethysmographic signal of an arteriole or a capillary;
   a pulse wave transit time acquirer that acquires a pulse wave transit time based on the electrocardiogramal detected by the electrocardiogramactrode and the photoplethysmographic signal detected by the photoplethysmographic sensor;
   a determiner that determines whether the pulse wave transit time has become stable after start of acquisition of the pulse wave transit time by the pulse wave transit time acquirer; and
   a blood pressure estimator that estimates a blood pressure based on the acquired pulse wave transit time and a predetermined relationship between the pulse wave transit time and the blood pressure; wherein
   the blood pressure estimator estimates the blood pressure after the determiner has determined that the pulse wave transit time has become stable; and
   the electrocardiogramactrode and the photoplethysmographic sensor are configured to detect the electrocardiogramal and acquire the photoplethysmographic signal at a same portion of a user's body.

10. The blood pressure estimating device according to claim 9, wherein, when the pulse wave transit time acquirer acquires the pulse wave transit time, the photoplethysmographic sensor is disposed so as to be in contact with a neck of a user at a position not directly over a carotid artery.

11. The blood pressure estimating device according to claim 9, wherein, when the pulse wave transit time acquirer acquires the pulse wave transit time, the photoplethysmographic sensor is disposed so as to be in contact with a neck of the user on a left lateral side of the neck.

12. The blood pressure estimating device according to claim 9, further comprising:
    a pressure detector that detects a pressure of the photoplethysmographic sensor; wherein
    the blood pressure estimator changes, in accordance with the pressure detected by the pressure detector, a transformation to be used when the blood pressure is calculated from the pulse wave transit time.

13. The blood pressure estimating device according to claim 12, further comprising:
    a pressure adjuster that adjusts the pressure to a predetermined value in accordance with the pressure of the photoplethysmographic sensor detected by the pressure detector.

14. The blood pressure estimating device according to claim 9, wherein a housing to which the photoplethysmographic sensor is attached is elastically deformable such that a contact area with a neck of the user is changed in accordance with the pressure of the photoplethysmographic sensor.

15. The blood pressure estimating device according to claim 9, wherein the light-emitting element outputs blue to yellow-green light.

16. The blood pressure estimating device according to claim 9, further comprising:
    an input that receives an operation of inputting a height or a sitting height of the user; wherein the blood pressure estimator obtains a length of an artery between an aortic valve and the carotid artery based on the height or sitting height received by the input and corrects the blood pressure in accordance with the length of the artery.

* * * * *